US012474612B2

(12) United States Patent
Kloeppner et al.

(10) Patent No.: US 12,474,612 B2
(45) Date of Patent: Nov. 18, 2025

(54) ELECTRO-OPTIC DEVICES MADE WITH SEBS MEMBRANES

(71) Applicant: GENTEX CORPORATION, Zeeland, MI (US)

(72) Inventors: Leroy J. Kloeppner, Jenison, MI (US); Joshua P. McClure, Jenison, MI (US); Wenhan He, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 616 days.

(21) Appl. No.: 17/896,215

(22) Filed: Aug. 26, 2022

(65) Prior Publication Data

US 2023/0068233 A1 Mar. 2, 2023

Related U.S. Application Data

(60) Provisional application No. 63/237,612, filed on Aug. 27, 2021.

(51) Int. Cl.
*G02F 1/1516* (2019.01)
*C09K 9/02* (2006.01)
*G02F 1/155* (2006.01)

(52) U.S. Cl.
CPC ............ *G02F 1/15165* (2019.01); *C09K 9/02* (2013.01); *G02F 1/155* (2013.01); *C09K 2211/10* (2013.01); *C09K 2211/1029* (2013.01); *C09K 2211/14* (2013.01)

(58) Field of Classification Search
CPC ................. G02F 1/15165; G02F 1/155; G02F 2001/164; G02F 1/1525; C09K 9/02; C09K 2211/10; C09K 2211/1029; C09K 2211/14

See application file for complete search history.

(56) References Cited

U.S. PATENT DOCUMENTS

| | | | |
|---|---|---|---|
| 10,774,191 B2 | 9/2020 | Erno et al. | |
| 2021/0103194 A1* | 4/2021 | Kloeppner | ............ G02F 1/1533 |
| 2021/0255517 A1* | 8/2021 | Looman | .............. G02F 1/15165 |

* cited by examiner

*Primary Examiner* — James C. Jones
(74) *Attorney, Agent, or Firm* — Price Heneveld LLP; Brian James Brewer

(57) ABSTRACT

An electro-optic device may comprise a first substrate having a first surface and a second surface; a second substrate having a third surface and a fourth surface, the second substrate disposed in a spaced-apart relationship relative to the first substrate such that the second and third surfaces are generally parallel to and face one another; a first electrode associated with the second surface; a second electrode associated with the third surface; a styrene-ethylene-butylene-styrene (SEBS) anionic exchange membrane disposed between the first and second electrodes; a first compartment defined by the SEBS anionic exchange membrane and the first substrate; a second compartment defined by the SEBS anionic exchange membrane and the second substrate; a cathodic species disposed in the first compartment; and an anodic species disposed in the second compartment.

17 Claims, 3 Drawing Sheets

ELECTRO-OPTIC DEVICES MADE WITH SEBS MEMBRANES

CROSS REFERENCE TO RELATED APPLICATIONS

This application claims the benefit of and priority to U.S. Provisional Patent Application No. 63/237,612, filed on Aug. 27, 2021, entitled "SEBS Anionic Exchange Membranes and Electro-Optic Devices Made with such Membranes," the entire disclosure of which is hereby incorporated herein by reference.

FIELD OF THE DISCLOSURE

This disclosure relates generally to a membrane in an electro-optic element, and in particular, to an anionic exchange membrane dividing a chamber of an electro-optic element.

BACKGROUND

In a conventional solution-based electro-optic element of an electro-optic device, an electrical potential must be constantly applied to the device in order to maintain the device in an activated, colored or darkened state. Once the electrical potential is removed, the electro-optic device will transition back to its inactivated, clear state. This phenomenon is often referred to as "self-erasing," and it means that constant power is needed to be applied to a device for the electro-optic device to remain in the darkened state. The constant power consumption may make some electro-optic applications difficult or impractical to implement.

SUMMARY

An electro-optic device may comprise a first substrate having a first surface and a second surface; a second substrate having a third surface and a fourth surface, the second substrate disposed in a spaced-apart relationship relative to the first substrate such that the second and third surfaces may be generally parallel to and face one another; a first electrode associated with the second surface; a second electrode associated with the third surface; an ion exchange membrane comprising styrene-ethylene-butylene-styrene (SEBS) and disposed between the first and second electrodes; a first compartment defined by the ion exchange membrane and the first substrate; a second compartment defined by the ion exchange membrane and the second substrate; a cathodic species disposed in the first compartment; and an anodic species disposed in the second compartment.

The ion exchange membrane may be an anionic exchange membrane. At least one of the cathodic species and the anodic species may be operable between an activated and an un-activated state based, at least in part, on an applied electrical potential, where operation between the activated state and the un-activated state corresponds to variable transmittance through the electro-optic device. The ion exchange membrane may be configured to inhibit diffusion of the cathodic species and the anodic species between the first compartment and the second compartment when in the activated state. The ion exchange membrane may comprise polystyrene-b-poly(ethylene-co-butylene)-b-polystyrene block polymers. The block polymers may be covalently functionalized with quaternized amine or ammonium cations that may be primarily attached to the polystyrene block of the copolymer, thereby physically crosslinking the block polymers with one another. The ion exchange membrane may be functionalized directly. The ion exchange membrane may be coated with a functionalized material.

The ion exchange membrane may act as a separator between the cathodic species and the anodic species. The ion exchange membrane may be configured to inhibit the passage of cations between the first compartment and the second compartment. The ion exchange membrane may be configured to allow the passage of ions between the first compartment and the second compartment. The ion exchange membrane may comprise two sides, and an electrolyte salt may be disposed on both sides of the ion exchange membrane. One of a cathodic electro-optic layer and an anodic electro-optic layer may be coated directly on a surface of the ion exchange membrane. A material reinforcement layer may be incorporated into the ion exchange membrane. The ion exchange membrane may be functionalized with at least one resonance-stabilized cation structure. The resonance-stabilized cation structure may include at least one of benzimidazolium, guanidinium, and pyridinium. The ion exchange membrane may comprise polymer styrene blocks that may be functionalized by at least 8% relative to styrene repeat units with quaternized amines. The ion exchange membrane may be configured to prevent or inhibit cationic species from the first compartment or second compartment from passing through the membrane.

DETAILED DESCRIPTION

The present disclosure relates to electro-optic elements and methods of forming electro-optic elements which are capable of being bi-stable and/or have memory, i.e., remain in an activated, colored state for a predetermined period of time while in an open circuit condition. It will be understood that the term "electro-optic" will be defined herein as a material that exhibits a change in its extinction coefficient at one or more wavelengths upon exposure to a particular electrical potential difference. Electro-optic components, as described herein, include materials whose color and/or opacity are affected by an electrical current, such that when an electrical potential is applied to the material, the color or opacity changes from a first state to a second state. A device that is capable of remaining in an activated, colored state for a certain period of time without the constant application of an electrical potential can be referred to as bi-stable or as having memory. In some device applications it may be desirable for the electro-optic device to be capable of remaining in an activated, colored state for a certain period of time without having to continuously apply an electrical potential. The ability of an electro-optic device to remain in an activated, colored state, i.e. the ability to have memory and not self-erase, in an open circuit condition can result in both less power consumption by the device over time and a device that does not need power to remain in the activated state.

A multi-compartment device that is able to maintain a darkened, or low-transmission state, at open circuit may include a cathodic compartment and an anodic compartment, with a separator layer therebetween. The separator layer may comprise a colorless or nearly colorless, transparent, chemically stable, ion exchange membrane. Such membranes allow for the free diffusion of an electrolyte ions of a particular charge through ion exchange membrane, but prohibit (or at least significantly impede) the free passage of the opposite charge. For example, if an ion exchange membrane is an anionic membrane, it will allow for passage of anions while excluding or inhibiting the passage of cations, and vice versa for a cation exchange membrane. Thus, where the device is in an electrochemically active and/or darkened state, passage of one charged type of ion is allowed while impeding the passage of the opposite charged ion.

Figure 1:
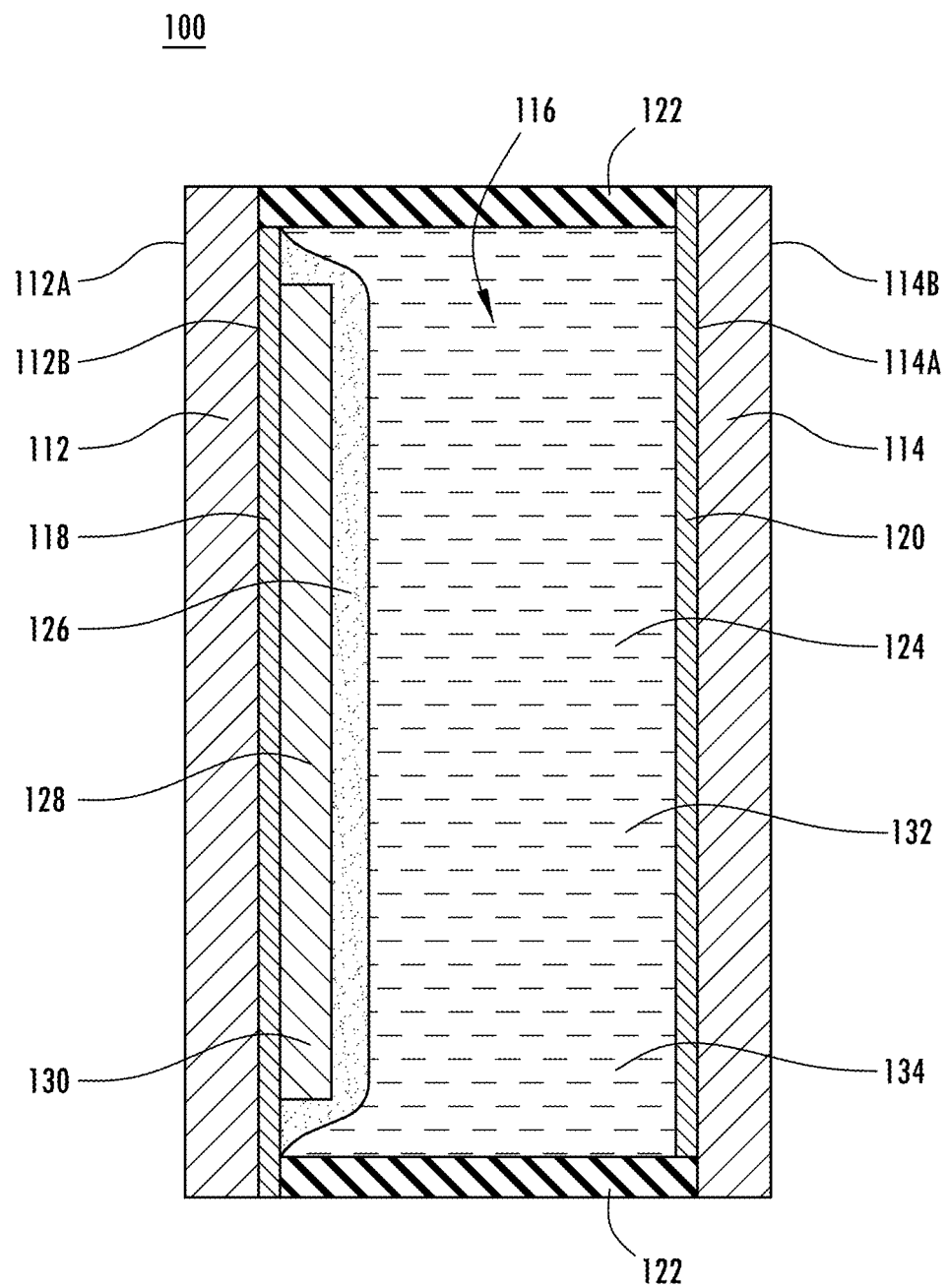
FIG. 1 is a cross-sectional view of a schematic drawing of an electro-optic element according to this disclosure.

FIG. 1 shows a schematic representation of an electro-optic (EO) device 100. EO device 100 generally comprises a first substrate 112 having a first surface 112A and a second surface 112B, and a second substrate 114 having a third surface 114A and a fourth surface 114B. First surface 112A can be an interior side of electro-optic element. For example, when electro-optic element is incorporated into a large-area device such as a sunroof or a window on a vehicle (not shown), first surface 112A can be considered the side facing the interior of the vehicle. Second substrate 114 may be generally parallel to first substrate 112, and second surface 112B may be opposite to third surface 114A. A sealing member 122 may extend between first and second substrates 112, 114 along at least a portion of a perimeter of EO device 100. Second surface 112B of first substrate 112, third surface 114A of second substrate 114, and sealing member 122 may define a chamber 116 between first and second substrates 112, 114.

One or more layers of electrically conductive material 118 may be associated with second surface 112B of first substrate 112. These layers 118 may serve as a first electrode for electro-optic device 100. Similarly, one or more layers of electrically conductive material 120 may be associated with and disposed on third surface 114A of second substrate 114 and may operate as a second electrode for electro-optic device 100.

Electro-optic element may further comprise a first electroactive compartment 128 within chamber 116 that includes a first electroactive solution, gel, or film 130 including a first electroactive component. It will be understood that the term "electroactive" will be defined herein as a material that undergoes a modification in its oxidation state upon exposure to a particular electrical potential difference. First electroactive compartment 128 may be disposed adjacent first electrically conductive layer 118 and between first substrate 112 and second substrate 114. A second electroactive compartment 132 within chamber 116 and comprising a second electroactive solution, gel, or film 134 including a second electroactive component may be disposed adjacent second electrically conductive layer 120 and between first substrate 112 and second substrate 114. First electroactive component may be one of a cathodic component and/or an anodic component and second electroactive component may be the other of a cathodic component and an anodic component or both. Typically, both of the anodic and cathodic components may be electroactive and at least one of them may be electro-optic. In some embodiments, both the anodic and the cathodic materials may comprise a solution based gel.

Electro-optic components, as described herein, include materials whose color and/or opacity are affected by electric current, such that when an electrical current is applied to the material, the color or opacity change from a first phase to a second phase. The electro-optic component may be contained in the first electroactive solution, gel, or film 130; the second electroactive solution, gel, or film 134; or both first and second electroactive solutions, gels, or films 130, 134.

An ion exchange membrane 126 may extend between first electroactive compartment 128 and second electroactive compartment 132 such that first electroactive compartment 128 is defined by ion exchange membrane 126 and first substrate 112 and second electroactive compartment 132 is defined by ion exchange membrane 126 and second substrate 114. Ion exchange membrane 126 may be transparent, colorless, and flexible and may function as an anionic exchange membrane. Ion exchange membrane 126 may comprise at least one polymer. The at least one polymer may comprise a styrene-ethylene-butylene-styrene (SEBS) block co-polymer and in some embodiments may comprise polystyrene-b-poly(ethylene-co-butylene)-b-polystyrene polymers. These SEBS block polymers may be covalently functionalized with quaternized amine or ammonium cations that may be primarily attached to the polystyrene block of the copolymer. Accordingly, blocks of polymer may be physically crosslinked but not chemically crosslinked with one another. Additionally, or alternatively, other types of cations, such as pyridinium or imidazolium groups, may be used to functionalize the polymer to convert it into an ion exchange membrane 126.

In some embodiments, ion exchange membrane 126 may be functionalized directly. In some embodiments, ion exchange membrane 126 may be coated with a functionalized material.

Ion exchange membrane 126 may be disposed between first electroactive compartment 128 and second electroactive compartment 132 and may be configured to inhibit diffusion of the first and second electroactive components between first and second electroactive compartments 128, 132. In some embodiments, ion exchange membrane 126 can be disposed over the first electroactive solution, gel, or film 130 such that the ion exchange membrane 126 may act as a separator between first electroactive solution, gel, or film 130 and second electroactive component of second electroactive solution, gel, or film 134. At least one of the first electroactive component and the second electroactive component may be electro-optic such that electro-optic element is configured to reversibly attenuate transmittance of light having a wavelength within a predetermined wavelength range when an electrical potential is applied across first and second electrically conductive layers 118, 120.

Ion exchange membrane 126 may be configured to exclude or inhibit the movement of cations across it. Accordingly, when the anodic and/or cathodic material is in an active state, the anodic and cathodic materials may comprise cations and cannot pass through ion exchange membrane 126 from first compartment to second compartment or vice versa. Ions may pass from one side of ion exchange membrane 126 if they are in a passive, anionic state, thereby allowing ion conductivity and subsequent operation of the cell. In some embodiments, a supporting electrolyte salt may be on both sides of ion exchange membrane 126, thereby allowing ion conductivity and the subsequent operation of the electro-optic element. In some embodiments, the cathodic and/or anodic materials may have anionic counter ions that may also serve as supporting electrolytes and that are free to pass through ion exchange membrane 126.

In some embodiments, ion exchange membrane 126 may be physically crosslinked instead of chemically cross-linked. In some embodiments, a cathodic or anodic electro-optic layer may be coated directly on a surface of ion exchange membrane 126. In some embodiments, a material reinforcement layer or material may be incorporated into ion exchange membrane 126 for improved mechanical strength.

In some embodiments, ion exchange membrane 126 may be functionalized with various resonance-stabilized cation structures including but not limited to benzimidazolium, guanidinium, and pyridinium. In addition, functionalization may be achieved with dimethyl-hexylamine, trimethyl-hexylamine, 1,4-diazabicyclo[2.2.2]octane, trimethyl-amine, triethylamine, and the like. In some embodiments, ion exchange membrane 126 may be functionalized with trimethyl amine, triethyl amine, and other trialkyl amines, pyridines, imidazoles and combinations thereof.

In one example, an electro-optic element uses an anionic exchange membrane made with a trimethyl amine functionalized SEBS polymer that uses a cathodic film and an anodic film coated on separated indium-tin-oxide (ITO) transparent conductive oxide (TCO) coated polyethylene-terephthalate (PET) plastic substrate and sandwiched on both sides of a functionalized SEBS anionic exchange membrane 126. The polymer styrene blocks are functionalized at 8% levels relative to the styrene repeat units with quarternized amines. The device is colored (darkened) for about 2 minutes at 1.2 volts then left at open circuit. After 90 minutes, the device is still significantly dark over this period which may indicate the presence of some memory properties in the device.

With proper functionalization, the SEBS ion exchange membrane 126 may exhibit good transparency and low or no color. The SEBS ion exchange membrane 126 may be robust and may have good compatibility with electro-optic solvents or plasticizers such as propylene carbonate, ethylene carbonate and gamma butyrolactone, and the like. The SEBS ion exchange membrane 126 may be a block co-polymer such that, with the right coating conditions, it may be coated or cast without the need for additional chemical crosslinking for mechanical strength. SEBS ion exchange membrane 126 may be able to be cross-linked through physical means and may exhibit low swelling or wrinkling. This is in contrast to many commercially available ion-exchange membranes that are either hazy, colored, not compatible with electro-optic solvents, and/or fragile and require fabric to strengthen them.

When the electro-optic element is in the activated, darkened state, diffusion of ions of a first charge may be inhibited while diffusion of ions of a second charge may be allowed. Thus, when the electro-optic element is in the activated, darkened state, the second electroactive component may be inhibited from diffusing from the second electroactive compartment 132, through the ion exchange membrane 126, and into the first electroactive compartment 128 when the electroactive component of the second electroactive compartment 132 is an ion in the active state of the first charge. Conversely, when the electro-optic element is in the activated, darkened state, the first electroactive component may be inhibited from diffusing from the first electroactive compartment 128, through the ion exchange membrane 126, and into the second electroactive compartment 132 when the electroactive component of the first electroactive compartment is an ion in the active state of the first charge. Inhibiting diffusion of the second electroactive component can facilitate inhibiting interaction of the second electroactive component with the first electroactive component and vice versa, which can result in self-erasing of the electro-optic element. The first electroactive component may be incorporated into first electroactive solution, gel, or film 130, which may inhibit movement of the first electroactive component. Inhibiting interaction of the first and second electroactive components may allow electro-optic element to maintain the darkened state for a predetermined period of time when placed in an open circuit, i.e., the electro-optic element can demonstrate memory for a predetermined period of time.

The cathodic component can be selected based on its suitability for use in either first electroactive solution, gel, or film 130 or second electroactive solution, gel, or film 134, based on the configuration of the electro-optic element 100. Non-limiting examples of cathodic components according to the present disclosure include a viologen, a viologen derivative, a methyl viologen, an octyl viologen, a benzyl viologen, a di-acrylate viologen, a di-vinyl viologen, a di-vinyl ether viologen, a di-epoxy viologen, a di-oxetane viologen, a di-hydroxy viologen, 1,1'-dialkyl-2,2'-bipyridinium, ferrocenium, substituted ferrocenium, a diimide, N,N'-dialkyl pyrometallic diimide, N,N'-dimethyl-1,4,5,8-naphthalene diimide, and combinations thereof. Exemplary viologen derivatives are described in U.S. Pat. Nos. 4,902,108; 6,188,505; 5,998,617; 9,964,828; and 6,710,906, the contents of which are all herein incorporated by reference in their entirety. In some embodiments, when first or second electroactive solution, gel, or film 130, 134 is a cathodic film, the cathodic component can include a polymer film, such as, for example, poly(3,4-ethylenedioxythiophene) or a polymeric metallocene or a polymeric viologen or combination thereof. In another embodiment, when first or second electroactive film 130, 134 is a cathodic film, the cathodic component can include a solid transition metal oxide, a non-limiting example of which includes oxides of tungsten.

The anodic component can be selected based on its suitability for use in either first electroactive solution, gel, or film 130 or second electroactive solution, gel, or film 134, based on the configuration of electro-optic element. Non-limiting examples of anodic components include metallocenes, 5,10-dihydrophenazines, phenothiazines, phenoxazines, carbazoles, triphendioxazines, triphenodithiazines, ferrocene, substituted ferrocenes, substituted ferrocenyl salts, phenazine, substituted phenazines, substituted phenothiazines, substituted dithiazines, thianthrene, substituted thianthrenes, di-tert-butyl-diethylferrocene, 5,10-dimethyl-5,10-dihydrophenazine (DMP), bis(triethylaminopropyl)dihydrophenazine bis(tetrafluoroborate), 3,7,10-trimethylphenothiazine, 2,3,7,8-tetramethoxy-thianthrene, 10-methylphenothiazine, tetramethylphenazine (TMP), bis(butyltriethylammonium)-para-methoxytriphenodithiazine (TPDT), and combinations thereof. When first or second electroactive solution, gel, or film 130, 134 is an anodic film, the anodic component can include a polymer film, such as a polyaniline film or a polythiophene film, a polymeric metallocene, or a solid transition metal oxide, including, but not limited to, oxides of vanadium, nickel, and iridium, as well as numerous heterocyclic compounds, etc. It will be understood that numerous other anodic materials are contemplated for use including those disclosed in U.S. Pat. Nos. 4,902,108; 6,188,505; 6,710,906; and 7,428,091, the contents of which are all herein incorporated by reference in their entirety.

First electroactive solution, gel, or film 130 may include a first electroactive component, either a cathodic component or an anodic component, which may be incorporated into a polymeric matrix to form a film. First electroactive component can be incorporated into a backbone of the polymeric chains of the polymeric matrix forming first electroactive solution, gel, or film 130 and/or covalently bonded to the polymeric chains as pendant groups. For example, first electroactive solution, gel, or film 130 may comprise a polymeric film including a plurality of polymeric chains composed of a number of repeating monomer units forming a backbone of the polymer chains. The first electroactive component may form pendant groups covalently attached to the backbone of the polymeric chains or may be disposed between monomer units of the backbone of the polymer chains. First electroactive solution, gel, or film 130 optionally may include a binder polymer (e.g., polymethylmethacrylate (PMMA), polyvinyl formal, or polyethylene glycol), a plasticizer that will help facilitate ion conductivity (e.g., propylene carbonate or gamma-butyrolactone), and/or a supporting electrolyte (e.g., tetraethylammonium tetrafluoroborate or lithium hexafluorophosphate).

Optionally, the polymer chains forming first electroactive solution, gel, or film 130 may be cross-linked. Cross-linking the polymer chains of first electroactive solution, gel, or film 130 may increase mechanical stability of first electroactive solution, gel, or film 130. The polymeric matrix may optionally include additional polymeric chains which do not include the first electroactive component. These additional polymeric chains may be formed from the same or different monomer units as the polymeric chains incorporating the first electroactive component and may optionally be cross-linked with the polymeric chains incorporating the first electroactive component. Non-limiting examples of materials that may be used with the polymeric matrix for covalently bonding the first electroactive component with the polymeric matrix to form first electroactive solution, gel, or film 130 include: polyacrylate, polymethacrylates, polypropylene methacrylates, polyethers, polyesters, polycarbonates, polyurethanes, polysiloxanes, polysilanes, polyacrylonitriles, polystyrenes, polymethacrylonitriles, polyamides, polyimides, polyvinylidene halides, and co-polymers, or combinations of any two or more thereof. Further examples of polymer matrix materials used in electro-optic elements can be found in U.S. Pat. Nos. 6,635,194; 5,940,201; 5,928,572; and 9,964,828, each of which are herein incorporated by reference in their entirety.

Second electroactive solution, gel, or film 134 includes the second electroactive component, either a cathodic component or an anodic component, depending on the configuration of electro-optic element, in either a solution phase, a gel phase, or as a film. When the second electroactive component is a cathodic component, second electroactive solution, gel, or film 134 can be referred to as a cathodic solution, a cathodic gel, or a cathodic film. When the second electroactive component is an anodic component, second electroactive solution, gel, or film 134 can be referred to as an anodic solution, an anodic gel, or an anodic film.

Electro-optic element can be incorporated into any suitable optical device, non-limiting examples of which include interior and exterior mirrors, architectural windows, vehicle windows, sunroofs, aircraft windows, camera filters, and eyewear, as well as other optical assemblies positioned within bezels and housings. Electro-optic element may include additional or fewer components arranged in a different manner without deviating from the scope of the present disclosure based on the intended application of electro-optic element, non-limiting examples of which include polarizers, reflective elements, and transflective elements.

Electro-optic element may be operable between a substantially clear state and a substantially dark or darkened state, as well as intermediate states thereto. The darkened state of electro-optic element is defined relative to the transmissivity of the substantially clear state. In some embodiments, transmissivity of electro-optic element in the substantially clear state may be greater than about 25%, greater than about 50%, greater than about 60%, greater than about 70%, or greater than about 85%. The percentage of reflectance, transmittance, and absorbance of electro-optic element sum to 100%. In some embodiments, the transmissivity of electro-optic element in the substantially darkened state may be less than about 25%, less than about 10%, less than about 1%, less than about 0.1%, or less than about 0.01%.

First and second substrates 112, 114 may be made from the same or different materials. The material of first and second substrates 112, 114 can vary based on the intended application of the electro-optic element and can be selected from materials such as glass, polymeric materials, ceramics, and other optically transparent or translucent material. In some embodiments, both first and second substrates 112, 114 may be optically transparent or translucent, while in other embodiments, only first substrate 112 is optically transparent or translucent and second substrate 114 is opaque or reflective.

First and second electrically conductive layers 118, 120 may be made from the same or different material. At least first electrically conductive layer 118 may be made from a transparent, electrically conductive material, and optionally both the first and second electrically conductive layers 118, 120 may be made from a transparent, electrically conductive material. In some examples, second electrically conductive layer 120 may be made from a non-transparent, electrically conductive material. First and second electrically conductive layers 118, 120 may be transparent or opaque depending upon the intended use of electro-optic element. For example, where electro-optic element is to be incorporated into a window, both electrically conductive layers 118, 120 should be substantially transparent, and where electro-optic element is to be incorporated into a mirror, at least one of the electrically conductive layers 118, 120 may be transparent.

Non-limiting examples of transparent electrically conductive materials include: fluorine doped tin oxide (FTO), indium doped tin oxide (ITO), doped zinc oxide, indium zinc oxide, insulator/metal/insulator (IMI) coatings like metal oxide/Ag/metal oxide or metal oxide/Ag alloy/metal oxide, silver nano-wire coatings, carbon nanotube coatings, graphene coatings, wire grids, and conductive polymers such as, but not limited to, poly(3,4-ethylenedioxythiophene) (PEDOT). Non-limiting examples of non-transparent electrically conductive coatings include metal coatings such as rhodium, chromium, nickel, silver, gold, and other metals, or mixtures of any two or more thereof. Optionally, one or both of the first and second electrically conductive layers 118, 120 may include additional layers or sub-layers. For example, second electrically conductive layer 120 may include a metal reflector or one or more coatings configured as a partially reflective, partially transmissive ("transflective") coating.

Figure 2A:
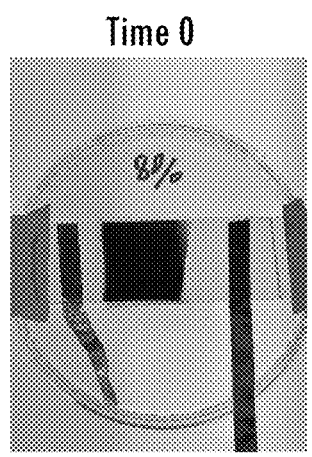
FIG. 2A is a photograph of an electro-optic element according to this disclosure that uses an anionic exchange membrane made with a SEBS polymer having a cathodic film and an anodic film coated onto indium-tin-oxide-coated-polyethylene-terephthalate (ITO-PET) and sandwiched on both sides of a functionalized SEBS anionic exchange membrane, shown immediately after the cessation of the application of an electrical potential.
Figure 2B:
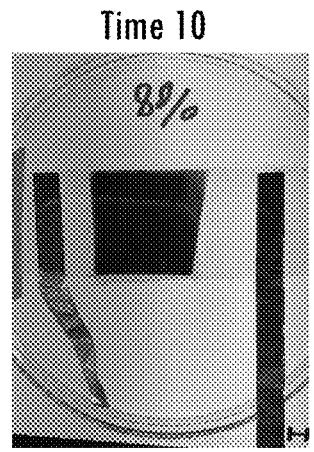
FIG. 2B is a photograph of the electro-optic element of FIG. 2A, shown ten minutes after the cessation of the application of an electrical potential.
Figure 2C:
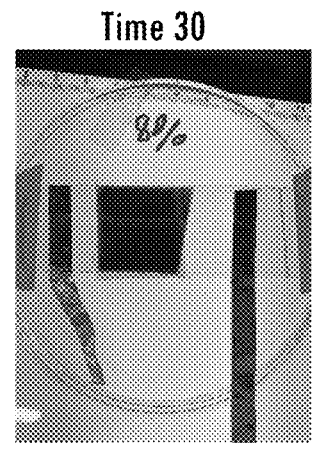
FIG. 2C is a photograph of the electro-optic element of FIG. 2A, shown thirty minutes after the cessation of the application of an electrical potential.
Figure 2D:
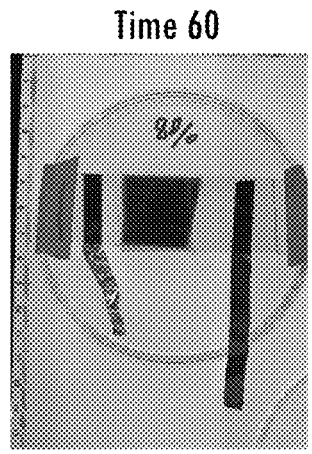
FIG. 2D is a photograph of the electro-optic element of FIG. 2A, shown sixty minutes after the cessation of the application of an electrical potential.
Figure 2E:
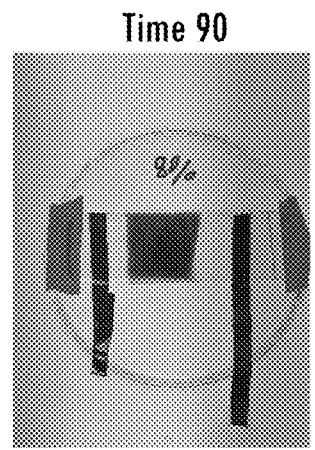
FIG. 2E is a photograph of the electro-optic element of FIG. 2A, shown ninety minutes after the cessation of the application of an electrical potential.

FIGS. 2A-2E illustrate an electro-optic cell made as described herein, to which an electrical potential was applied. After the electrical potential of 1.2 volts had been applied to the electro-optic cell for about 2 minutes, shown in FIG. 2A, the electro-optic cell is left with an open circuit for extended periods. FIG. 2B shows the electro-optic cell 10 minutes after the electrical potential has been applied. FIG. 2C shows the electro-optic cell 30 minutes after the electrical potential has been applied. FIG. 2D shows the electro-optic cell 60 minutes after the electrical potential has been applied. FIG. 2E shows the electro-optic cell 90 minutes after the electrical potential has been applied. As shown, the electro-optic cell remains in a darkened state, even without the application of an electrical potential.

Figure 3:
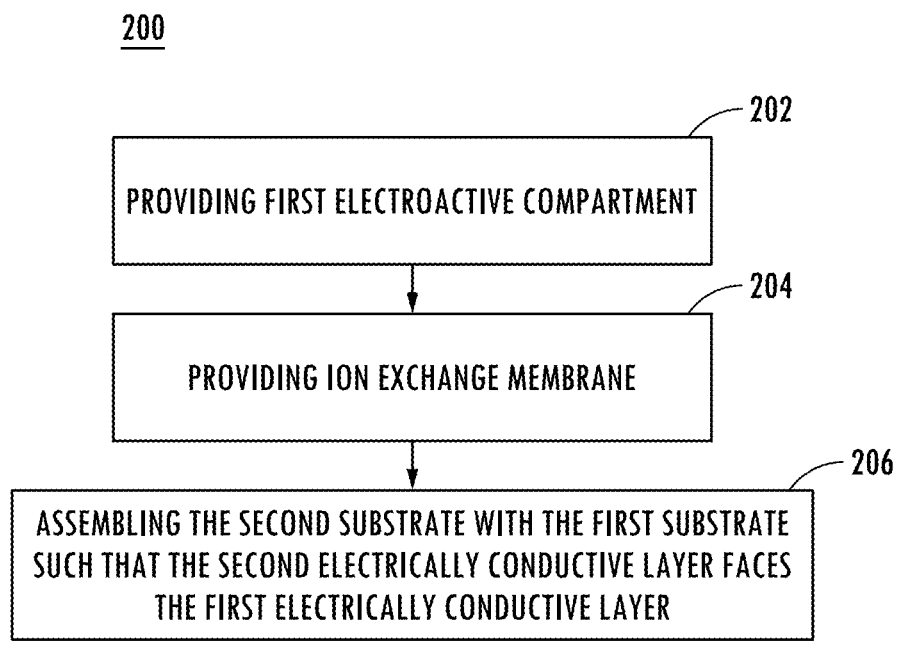
FIG. 3 illustrates a flow chart of a method of forming an electro-optic element according to an aspect of this disclosure.

FIG. 3 illustrates a method 200 of forming an electro-optic element according to an embodiment of the present disclosure. While the method 200 is described in the context of forming the electro-optic element 100 of FIG. 1, it is understood that the method 200 may be used to form other electro-optic elements. It is understood that the method 200 may include additional or fewer steps, unless stated otherwise, or be combined with other methods for forming electro-optic elements, devices, and assemblies without deviating from the scope of the present disclosure.

The method 200 may include providing first electroactive compartment 128 at step 202. Providing first electroactive compartment 128 may include providing first electroactive solution, gel, or film 130 disposed on first electrically conductive layer 118, which may be disposed on first substrate 112. First electroactive solution, gel, or film 130 and/or first electrically conductive layer 118 may be disposed on the first substrate 112 and stored for a predetermined period of time until use or formed immediately prior to providing the ion exchange membrane 126 at step 204. For example, first electrically conductive layer 118, as well as any additional layers or coatings, may be formed on first substrate 112 and stored as a pre-form until first electroactive solution, gel, or film 130 is deposited or formed on first electrically conductive layer 118, prior to providing the ion exchange membrane 126 over first electroactive solution, gel, or film 130 at step 204. In another example, the pre-form can include first substrate 112, the first electrically conductive layer 118, and first electroactive solution, gel, or film 130.

After forming first electroactive compartment 128, ion exchange membrane 126 can be provided at step 204 by disposing ion exchange membrane 126 on at least first electroactive solution, gel, or film 130. In some embodiments, ion exchange membrane 126 may be provided on first electroactive solution, gel, or film 130 such that any exposed surface of first electroactive solution, gel, or film 130 is covered by the ion exchange membrane 126. In another example, only those surfaces of first electroactive solution, gel, or film 130 that will ultimately be disposed within chamber 116 can be covered by the ion exchange membrane 126.

At step 206, the second electroactive compartment 132 can be formed by assembling the second substrate 114 with the first substrate 112 such that the second electrically conductive layer 120 is facing the first electrically conductive layer 118. One or more sealing members 122 can be provided to form the primary seal around a perimeter of the electro-optic element and couple the first and second substrates 112, 114, thereby forming chamber 116. Optional spacers, such as glass beads, can be provided to facilitate maintaining a desired spacing between the first and second substrates 112, 114. Once chamber 116 is formed, second electroactive solution, gel, or film 134 including the second electroactive component can be provided into chamber 116 through a suitable filling port or gap in sealing member 122. In one example, second electroactive solution, gel, or film 134 can be provided into chamber 116 under vacuum. The filling port or gap can be sealed after second electroactive solution, gel, or film 134 has been provided to chamber 116. In another example, second electroactive solution, gel, or film 134 can be formed on the second electrically conductive layer 120, which is disposed on first substrate 112, and then laminated to ion exchange membrane 126.

The second electroactive component can be provided to chamber 116 in a composition in either a solution phase or gel phase. The composition including the second electroactive component can optionally include additional components, examples of which including thickening materials, gelling materials, solvents, electrolyte salts, and the like. In one example, the second electroactive component can be provided in second electroactive solution, gel, or film 134 which may be configured to remain in the solution phase during normal use conditions of the electro-optic element. In another example, the second electroactive component can be provided to chamber 116 as a pre-gel solution which, upon curing, forms second electroactive solution, gel, or film 134 in second electroactive compartment 132. Curing of electroactive gel can include allowing second electroactive solution, gel, or film 134 to rest for a predetermined period of time, the application of heat, the application of radiation (e.g., ultraviolet light), and/or exposure to a cross-linking material. In one example, the second electroactive component can be provided to chamber 116 as a partially cured electroactive gel and curing can be completed once second electroactive gel 128 is disposed within chamber 116.

Incorporating one of the cathodic or anodic component in a polymeric matrix inhibits movement of the incorporated component, thus minimizing the ability of the incorporated component to participate in reactions that may result in self-erasing. Incorporating the first electroactive component in a polymeric film can be considered as confining the first electroactive component within a predetermined region of the electro-optic element. Providing the second electroactive component in a solution or gel phase, allows the second electroactive component to be backfilled into the chamber 116 under controlled conditions (e.g., under vacuum, under low oxygen atmosphere). Some materials may be sensitive to environmental conditions, such as moisture and oxygen, and thus it may be desirable to assemble the electro-optic element under controlled conditions that limit exposure of the electro-optic element materials to these environment conditions. The ability to provide the second electroactive component as a liquid or gel into a fully or partially assembled electro-optic element can facilitate controlling the exposure of the components of the electro-optic element. For example, it may be easier to protect materials from oxygen by backfilling an electro-optic element under vacuum with a solution or gel phase electroactive component compared to trying to assemble an electroactive component incorporated into a film provided on a substrate.

Because the second electroactive component is provided in a liquid or gel phase, the second electroactive component is capable of diffusion within the second electroactive compartment 132. Ion exchange membrane 126 may be configured to inhibit movement of the second electroactive component into first electroactive compartment 128 and thereby inhibit interaction of the first and second electroactive components. In one embodiment, the first electroactive component may be confined within the polymeric matrix of the electroactive film, the ion exchange membrane 126 need only inhibit movement of the second electroactive component. In this manner the hybrid electro-optic element of the present disclosure can be tailored to utilize certain advantages of incorporating an electroactive component in a polymeric matrix and certain advantages of a solution or gel phase electroactive component, based on the particular materials used and the desired characteristics of the thus formed electro-optic element.

The following examples describe various features and advantages provided by embodiments of the present disclosure and are in no way intended to limit the present disclosure and the appended claims.

EXAMPLES

Example 1: Synthesis of
7-Bromo-2-methyl-2-heptanol 8.0 mL Ethyl 6-bromohexanoate and 50 mL anhydrous diethyl ether were added to a 250 mL round bottom flask in inert atmosphere. After cooling flask in an ice bath, 36 mL methylmagnesium bromide solution (3.0 M in ether) was slowly added to the round bottom flask through addition funnel. The ice bath was then removed, the reaction mixture was then stirred at room temperature for 48 hours. The reaction was slowly quenched with saturated ammonium chloride aqueous solution. The aqueous phase was extracted with diethyl ether three times. The organic phase was combined, dried over anhydrous magnesium sulfate, and concentrated on a rotary evaporator. The crude product was further purified by vacuum distillation. The pure product is a colorless liquid.

Example 2: Synthesis SEBS-C5-Br-0.6

To a 100 ml Schlenk flask was added 1.0 g of the SEBS block copolymer (Mn=118,000), commercially available from Sigma-Aldrich and 580 mg 7-bromo-2-methyl-2-heptanol. The flask was evacuated and purged with nitrogen gas. 20 mL anhydrous dichloromethane was added using a syringe, and the solution was stirred until all polymer completely dissolves. After cooling the reaction mixture in an ice bath, 0.3 mL triflic acid was then added and the reaction was stirred at about 0° C. for 1 hour. The reaction mixture was then poured into methanol to precipitate the white polymer. The polymer was collected through vacuum filtration and redissolved in tetrahydrofuran (THF). The THF solution was again poured into the methanol and the pure polymer product was isolated through vacuum filtration and dried at room temperature overnight.

Example 3: Preparation of SEBS-C5-TMA-0.6
Membrane 90 mg SEBS-C5-Br-0.6 was dissolved in 4.0 mL toluene in a 20 mL vial. The solution was filtered and cast onto a PTFE flat surface. The solution with the PTFE slice was dried in a 60° C. oven overnight to form a transparent membrane. The membrane was removed from the PTFE and immersed in aqueous trimethylamine (25 wt. % in water) at 45° C. for 24 hours. Then the membrane from the solution and was then rinsed with water 3 times and ion exchanged to a tetrafluoroborate anion by immersing in 0.1 M tetraethylammonium tetrafluoroborate (TEABF$_4$) solution in PC solution at room temperature for 2-3 days.

Cell Test:

Example 4: Preparation of Cathodic Solution

To a 115 mL glass bottle was added a rare earth magnet stir bar, 5.70 g poly(vinyl acetate) (PVAc) solid (500K), 7.47 g 1,1'-bis[6-(triphenylphosphoranyl) hexyl]-4,4'-bipyridium tetra(tetrafluoroborate) and 0.021 g decamethyl ferrocenium tetrafluoroborate. Powder was stirred with stir rod to disperse polymer beads. 88 g of a 15% 1:10, 2-hydroxyethyl methacrylate:methylacrylate copolymer (15% Copolymer) in propylene carbonate (PC), 7.66 g PC and 0.240 g Glide 410 (10% in PC) surfactant were added followed by stir rod to disperse powder. The solution was stirred at 165° C. for 45 min with N$_2$ bubbling before cooling down and added 100.8 µL dibutyltin diacetate (1% solution in PC).

Example 5: Preparation of Anodic Solution

To a 115 mL glass bottle was added 5.70 g PVAc Solid (500K), 3.198 g N5,N5,N5,N10,N10,N10-hexaethyl-5,10-phenazine dipropanaminiumbis(tetrafluoroborate), 0.016 g decamethylferrocene. Powder was stirred with stir rod to disperse polymer beads. 88 g 15% Copolymer in PC, 11.037 g PC and 0.240 g Glide 410 (10% in PC) were added followed by stir rod to disperse powder. The solution was stirred at 165° C. for 1 hour and 45 min with N$_2$ bubbling before cooling down and added 0.9 g 1% methoxyethoxyethoxy acetic acid in PC.

Example 6: Preparation of Lupranate MI (BASF)
and PC Solution

To a 20 mL vial, mix 0.336 g Lupranate MI and 10.57 g PC.

Example 7: Casting the Solution on an ITO Coated
PET Substrate

The cathodic casting solution was prepared by mixing cathodic solution and Lupranate MI and PC solution with 10:1 weight ratio. The anodic casting solution was prepared by mixing anodic solution and Lupranate MI and PC solution with 10:1 weight ratio. Both freshly prepared solutions were casted on to an ITO coated PET substrate through drawdown coating with a 40 Meyer Rod with release liner serving as a spacer and mask. The coated film was place in a 65° C. oven for 10-15 minutes.

Example 8: Preparation the Cell and Test its
Memory Effect

The cured cathodic film and anodic film were cut into small pieces which were about 1 inch by 1 inch. The cell was assembled by sandwiching the SEBS-C5-TMA-0.6 membrane between the cathodic and anodic film. The whole cell was darkened at 1.2 V and the memory effect was tested by observing the fade of the color over the time under the open-circuit voltage.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a perhaloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 2 to 12 carbons, or, typically, from 2 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Unless expressly stated otherwise, reference to any group, e.g. alkyl, aryl, heteroaryl, heterocyclyl, cyclyl, alkenyl, alkynyl, etc, includes reference to both substituted and unsubstituted such groups.

With regard to the substrates and conductive coatings on the substrates, those typically used in solution-based electro-optic devices may be used. For example, the one or both substrates may be glass, metal, plastic, or ceramic. The conductive coating on one or more of the substrates may be transparent or opaque depending upon the intended use of the device. For example, where the device is a window, both coatings should be substantially transparent, and where the device is a mirror at least one coating is transparent. Illustrative, transparent conductive materials include, but are not limited to, fluorine doped tin oxide (FTO), indium/tin oxide (ITO), doped zinc oxide, indium zinc oxide, metal oxide/Ag/metal oxide, silver nano-wire coatings, carbon nano-tubes, graphene coatings, wire grids, conductive polymers such as, but not limited to, poly(3,4-ethylenedioxythiophene) (PEDOT). Non-transparent conductive coatings include metal coatings such as rhodium, chromium, nickel, silver, gold, and other metals, or mixtures of any two or more thereof.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. An electro-optic device comprising:
a first substrate having a first surface and a second surface;
a second substrate having a third surface and a fourth surface, the second substrate disposed in a spaced-apart relationship relative to the first substrate such that the second and third surfaces are generally parallel to and face one another;
a first electrode associated with the second surface;
a second electrode associated with the third surface;
an ion exchange membrane comprising a functionalized styrene-ethylene-butylene-styrene (SEBS) polymer disposed between the first and second electrodes;
a first compartment defined by the ion exchange membrane and the first substrate;
a second compartment defined by the ion exchange membrane and the second substrate;
a cathodic species disposed in the first compartment; and
an anodic species disposed in the second compartment.

2. The electro-optic device of claim 1, wherein the ion exchange membrane is an anionic exchange membrane.

3. The electro-optic device of claim 2, wherein the ion exchange membrane acts as a separator between the cathodic species and the anodic species when in the activated state.

4. The electro-optic device of claim 1, wherein at least one of the cathodic species and the anodic species are operable between an activated and an un-activated state based, at least in part, on an applied electrical potential, where operation between the activated state and the un-activated state corresponds to variable transmittance through the electro-optic device.

5. The electro-optic device of claim 1, wherein the ion exchange membrane comprises a functionalized polystyrene-b-poly(ethylene-co-butylene)-b-polystyrene block polymers.

6. The electro-optic device of claim 5, wherein the block polymers are covalently functionalized with quaternized amine or ammonium cations that are primarily attached to the polystyrene block of the copolymer.

7. The electro-optic device of claim 1, wherein the ion exchange membrane is functionalized directly.

8. The electro-optic device of claim 1, wherein the ion exchange membrane is configured to inhibit diffusion of the cathodic species and the anodic species between the first compartment and the second compartment.

9. The electro-optic device of claim 1, wherein the ion exchange membrane is configured to inhibit the passage of cations between the first compartment and the second compartment.

10. The electro-optic device of claim 9, wherein the ion exchange membrane is configured to allow the passage of ions between the first compartment and the second compartment.

11. The electro-optic device of claim 10, wherein the ion exchange membrane comprises two sides, and wherein an electrolyte salt is disposed on both sides of the ion exchange membrane.

12. The electro-optic device of claim 1, wherein one of a cathodic electro-optic layer and an anodic electro-optic layer is coated directly on a surface of the ion exchange membrane.

13. The electro-optic device of claim 1, wherein a material reinforcement layer is incorporated into the ion exchange membrane.

14. The electro-optic device of claim 1, wherein the ion exchange membrane is functionalized with at least one resonance-stabilized cation structure.

15. The electro-optic device of claim 14, wherein the resonance-stabilized cation structure include at least one of benzimidazolium, guanidinium, and pyridinium.

16. The electro-optic device of claim 1, wherein the ion exchange membrane comprises polymer styrene blocks that are functionalized by at least 8% relative to styrene repeat units with quaternized amines.

17. The electro-optic device of claim 1, wherein the ion exchange membrane is configured to prevent or inhibit cationic species from the first compartment or second compartment from passing through the membrane.

* * * * *